Aug. 16, 1932.   T. R. GOLDSBOROUGH   1,872,630
SOUND RECORDING SYSTEM
Filed May 1, 1930
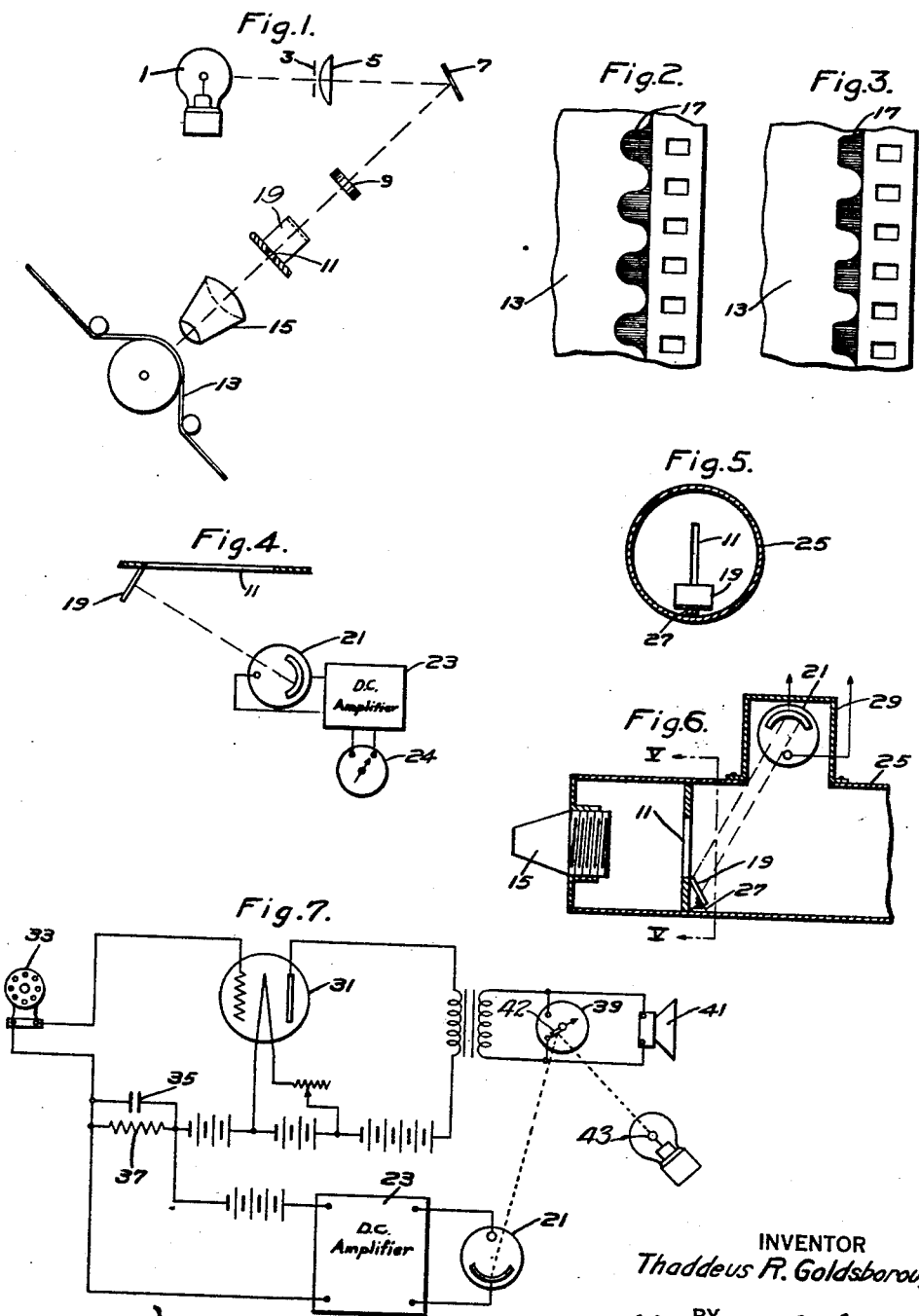
INVENTOR
Thaddeus R. Goldsborough.
BY
Chesley G. Carr
ATTORNEY Patented Aug. 16, 1932

1,872,630

UNITED STATES PATENT OFFICE

THADDEUS E. GOLDSBOROUGH, OF WILKINSBURG, PENNSYLVANIA, ASSIGNOR TO WESTINGHOUSE ELECTRIC & MANUFACTURING COMPANY, A CORPORATION OF PENNSYLVANIA

SOUND RECORDING SYSTEM

Application filed May 1, 1930. Serial No. 448,873.

My invention relates to photo-acoustic recorders and has particular relation to photo-acoustic optical systems used in producing sound records of the variable-width type.

A photo-acoustic optical system of this nature ordinarily comprises a source of light, a mask and a system of lenses for condensing the light. A mirror, mounted on the moving element of a galvanometer, is illuminated by the condensed light, and a beam, substantially rectangular in transverse cross section, is reflected from the mirror. An illuminated rectangle is thus produced on an obstruction interposed in the path of the light beam and, when the mirror is oscillated by reason of the motion of its mounting under the action of the energized galvanometer magnet, the position of the rectangle on the obstruction is changed.

The light beam reflected from the galvanometer mirror is attenuated and partially illuminates a slit which is, in turn, imaged on the film.

The variation in the audio-current produces variations in the amplitude of the oscillations of the galvanometer mirror, and consequent variations in the length of the slit illuminated. The variable-width-slit image is impressed in permanent form on the film.

Excessive deflection of the light beam, effected by excessive current in the galvanometer, which is known as "over-shooting," produces distortion in the photo acoustic record that appears as distortions in the sound reproduced from the record. Since the total lateral variation in the position of the beam is ordinarily small, very little over-shooting is sufficient to distort the wave recorded on the film.

In sound-recording optical systems constructed and operated according to the teachings of the prior art, with which I am familiar, the monitoring system, that is provided for preventing over-shooting, is not satisfactory. Ordinarily, a highly diffuse reflecting surface is provided in the path of the light beam, partially obstructing the beam. The variation, in position, of the end of the light beam on this surface is observed by an operator who regulates the gain control of the recording amplifier in such manner that the end of the beam does not pass beyond a black line drawn on the surface.

This method of regulating the magnitude of the deflection of the recording light beam is, obviously, extremely crude, and the difficulties that arise in its use are numerous.

It is virtually impossible for the operator to accurately align the end of the light beam and the black line, and, consequently, he is obliged to hold the volume to such a magnitude that there is a space between the end of the recording light beam and the line. Furthermore, sudden variations in volume take place before the operator can prepare for them and, as a result, the peaks of the sound track, where short, loud sounds are interposed between long, soft ones are almost invariably cut off. Such a situation results in a complete destruction of dynamic effects in recorded music.

In recording sound by the photo-acoustic method, it has been customary to use a number of recorders and thus to make certain that, at least, one negative, which is tolerably undistorted, will be available in the end. Film is rather expensive and, consequently, such process is rather costly. Moreover, where only a single recorder is available, the production of the distorted negative, by reason of improper monitoring, and the consequent necessity of recording again, involves a considerable expense.

It is, accordingly, an object of my invention to produce an effective monitoring system for a photo-acoustic sound recorder.

Another object of my invention is to provide a recording optical system equipped with means for immediately and clearly signaling an operator that the recording light beam is over-shooting.

An additional object of my invention is to provide a photo-acoustic optical system equipped with a monitoring device that shall be actuated by the recording light beam to produce a signal indicating that said light beam has been excessively deflected.

Still another object of my invention is to provide a photo-acoustic recording system wherein the gain is controlled automatically.

A still further object of my invention is to provide a photo-acoustic recording system wherein the magnitude of the deflection of the light beam is regulated automatically by the light beam itself.

More specifically stated, it is an object of my invention to provide, for a photo-acoustic recording system, a photo-sensitive signalling device that shall respond to the recording light beam to effect a reduction in the magnitude of the deflection of said light beam.

According to my invention, I provide a recording optical system equipped with a mirror that reflects the over-shot light of the recording light beam into one or a plurality of photo-sensitive devices. The latter, in turn, when energized, actuate an electrical relay system to produce a signal, thus notifying the operator that the system is overshooting.

In a modification of my invention, I so couple the output of the relay system to the recording amplifier that the deflection of the recording light beam is automatically regulated from the photo-sensitive means.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which, Figure 1 is a schematic drawing showing a photo-acoustic recording optical system;

Fig. 2 is a view, in front elevation, of a film strip showing a properly recorded sound track;

Fig. 3 is a view, in front elevation, of a film strip showing a sound track that has been over-shot;

Fig. 4 is a schematic drawing showing the principal features of an embodiment of my invention;

Fig. 5 is a sectional view taken along line V—V of Fig. 6;

Fig. 6 is a view, in section, showing the actual disposition of the elements constituting my invention, and, Fig. 7 is a schematic drawing, showing a modification of my invention.

The apparatus shown in Fig. 1 comprises a source of illumination 1, the rays from which traverse a rectangular mask 3 and are converged, by a condensing lens 5, to illuminate a mirror 7 that is rigidly mounted on the moving element of a recording galvanometer (not shown). The light reflected from the galvanometer mirror 7 is converged by a cylindrical lens 9 to produce an elongated rectangular image for illuminating a portion of a slit 11. As the suspension of the galvanometer is motivated by the current from the recording amplifier, the galvanometer mirror 7 oscillates to cause the rectangular image on the slit 11 to move longitudinally along the slit and illuminate the section of the slit that is dark when the galvanometer is not excited by the audio-current.

The ratio of the fraction of the slit 11 that is illuminated, when there is zero current in the galvanometer, to the total length of slit, determines the magnitude of the modulation of the sound track, i. e. the maximum volume of sound reproducable from a sound track under given conditions. For 100% modulation, the slit is completely dark or completely illuminated depending on the polarity of the modulation. That is to say, if the modulation is positive, the whole slit is illuminated and, if it is negative, the whole slit is dark.

An image of the slit 11 is cast on a moving film strip 13 by an objective 15 and, since illumination of a certain length of slit produces a slit image on the film 13 of proportionate length, a photographic strip 17 is produced on the film that has a width which varies in accordance with the response of the galvanometer mirror to the audio-current.

It is seen that, if the galvanometer mirror is excessively deflected, the extreme end of the illuminated rectangle is obstructed by the boundaries of the slit and, consequently, the peaks of the sound track are flat, as shown in Fig. 3, rather than round, as shown in Fig. 2, In accordance with my invention, I provide a reflector 19 adjacent to the slit 11 and at an angle to the plane thereof. When the recording light beam is excessively deflected, the mirror 19 reflects the light into one or a plurality of photo-sensitive cells 21. The cells 21 may be coupled to an amplifier 23 or they may be connected in a circuit in such manner as to actuate a grid-glow tube or a similar relay. In any case, a meter 24, disposed in the output circuit of the device 23 and actuated by the photo-cell 21, responds, when the photo cell is energized to notify an operator that the recording light beam is being excessively deflected.

In Figs. 5 and 6, the actual disposition of the apparatus provided according to my invention is shown. The slit 11 is mounted in a hollow tube 25, one end of which is adapted to receive the objective 15. Supported on a bracket 27 of transverse V-section, adjacent to the bounding edge of the slit 11, is the mirror 19. The photo-electric cell 21 is supported in an inclosure 29 which is fastened to the tube 25 near an opening therein and is capable of receiving the light reflected from the mirror 19.

Although, in the preferred embodiment of my invention shown herein, the mirror 19 is disposed adjacent to the slit 11, it is apparent that the mirror may be located in any one of numerous other positions in the system where it is capable of responding to over-shooting.

As has been explained hereinabove, in photo-acoustic optical systems, constructed according to the teaching of the prior art, the movement of the light beam, on a highly diffuse reflecting surface equipped with a black line, is observed. It is possible to locate the monitoring mirror adjacent to the line on the surface. Recording optical systems wherein the monitoring mirror 19 is disposed in other positions than at the slit 11 are within the scope of my invention.

In Fig. 7, a modification of my invention is shown wherein the photo-cell 21 is so disposed that it automatically regulates the magnitude of amplification of the recording amplifier. The outut of an amplifier or relay 23, actuated by the photo-cell 21, supplies a grid-biasing voltage to the tube 31 of the voice-amplifier in such direction that the amplification is decreased when the current in the monitoring photo-cell 21 is increased.

As shown in Fig. 7, the amplifier 23 is connected in the circuit of the amplifying stage that is directly coupled to the microphone 33. To prevent the system from being excessively affected by a sudden rush of current from the amplifier 23, a condenser 35 is connected in parallel with the resistor 37 across which the valve voltage is impressed.

The single-stage amplifier is also shown as directly coupled to the galvanometer 39. It is, of course, within the scope of my invention to apply the device to a system wherein a plurality of stages of amplification are present and to couple the valve 23 to any one or to any number of these stages.

My invention has particular application to sound-reproducing equipments, such as public-address systems. It may be used to limit the volume of the output of such apparatus. The electrical circuit for such system is also illustrated schematically in Fig. 7. A galvanometer 39, similar to the ordinary recording galvanometer, is connected in parallel with the loud speaker 41, in the output of the amplifying system. The vibrating mirror 42 of the galvanometer determines the magnitude of deflection of a light beam that is adapted to energize the photo-cell 21, if deflected beyond a predetermined angle. The photo-cell 21 is energized by a beam from a source 43 which is projected thereon when the galvanometer mirror 42 is excessively deflected. The photo-cell 21, in turn, actuates the amplifier 23 which automatically regulates the amplification, as has been explained hereinabove.

Although I have shown and described certain specific embodiments of my invention, I am fully aware that many modifications thereof are possible. My invention, therefore, is not to be restricted except insofar as may be necessitated by the prior art and by the spirit of the appended claims.

I claim as my invention:

1. In combination with means for transforming sound vibrations into vibratory electric currents, a galvanometer of the mirror-type traversed by said currents, a light source adapted to project a light-beam incident upon said galvanometer mirror, an optical slit through which the reflected beam from said galvanometer mirror is projected, an edge of said reflected beam crossing said slit in the mid-portion thereof when no current flows in said galvanometer and moving back and forth toward the ends of said slot when current vibrations flow therein, a reflector positioned beyond one end of said slit and positioned to reflect said reflected beam only when its edge overruns the end of said slit, a photo-electric device positioned to be struck by the beam emanating from said reflector, and signal means connected to respond to the excitation of said photo-electric device.

2. In combination with means for causing a light-beam to oscillate in correspondence with sound vibrations, a light-sensitive receiving device onto which said light-beam is projected through an optical slit, a mirror adjacent said slit positioned to be struck by said beam only when, in its oscillations, it overruns a margin of said slit, a photo-electric device positioned in the path of the beam when reflected from said mirror, and a signal device connected to respond to the excitation of said photo-electric device.

In testimony whereof, I have hereunto subscribed my name this 24th day of April, 1930.

THADDEUS R. GOLDSBOROUGH.